United States Patent [19]

Lin

[11] Patent Number: 5,706,606

[45] Date of Patent: Jan. 13, 1998

[54] DEVICE FOR SHUTTING A SLIDING DOOR

[76] Inventor: Kanial Lin, P.O. Box 63-99, Taichung, Taiwan

[21] Appl. No.: 652,802

[22] Filed: May 23, 1996

[51] Int. Cl.$^6$ .............................................. E05D 15/06
[52] U.S. Cl. ................................... 49/404; 49/386
[58] Field of Search ................... 49/404, 386; 16/86, 16/66

[56] References Cited

U.S. PATENT DOCUMENTS

| | | | |
|---|---|---|---|
| 3,278,979 | 10/1966 | Clement | 16/84 X |
| 4,003,102 | 1/1977 | Hawks et al. | 49/404 X |
| 4,974,285 | 12/1990 | Enrietti | 16/66 |
| 5,157,806 | 10/1992 | Wartian | 16/84 X |
| 5,220,706 | 6/1993 | Bivens | 16/84 X |
| 5,313,739 | 5/1994 | Nelson et al. | 49/404 |
| 5,471,708 | 12/1995 | Lynch | 16/84 X |

*Primary Examiner*—Kenneth J. Dorner
*Assistant Examiner*—Curtis Cohen
*Attorney, Agent, or Firm*—Charles E. Baxley, Esq.

[57] ABSTRACT

A sliding door shutting device includes a barrel slidably engaged in a housing and has a plug secured on one end and slidably engaged in the housing. The plug has an annular groove defined by two side walls. A spring may bias the barrel inward of the housing. The sealing ring is engaged with one side wall for allowing air to bypass the plug when the barrel is moved outward of the housing, and the sealing ring is engaged with the other side wall so as to make an air tight seal between the plug and the housing when the barrel is moved inward of the housing.

1 Claim, 6 Drawing Sheets

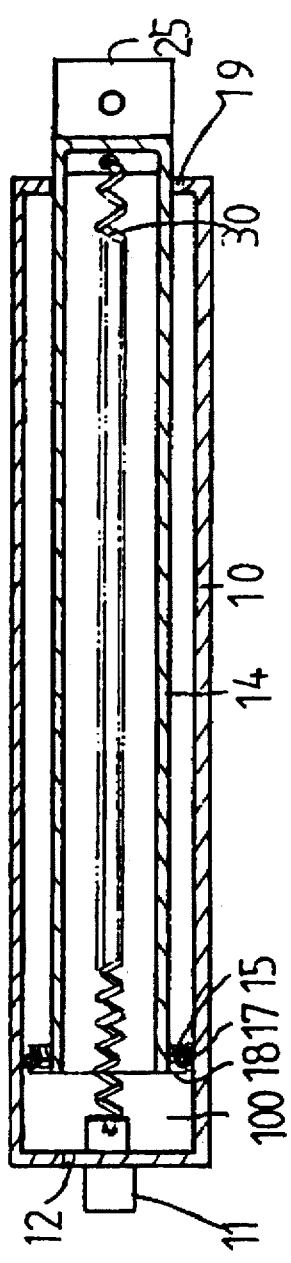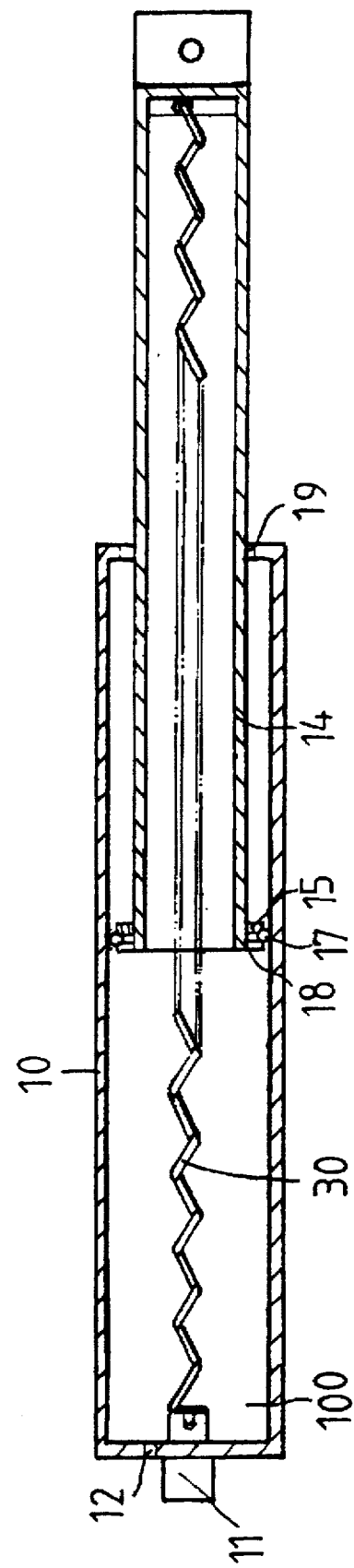

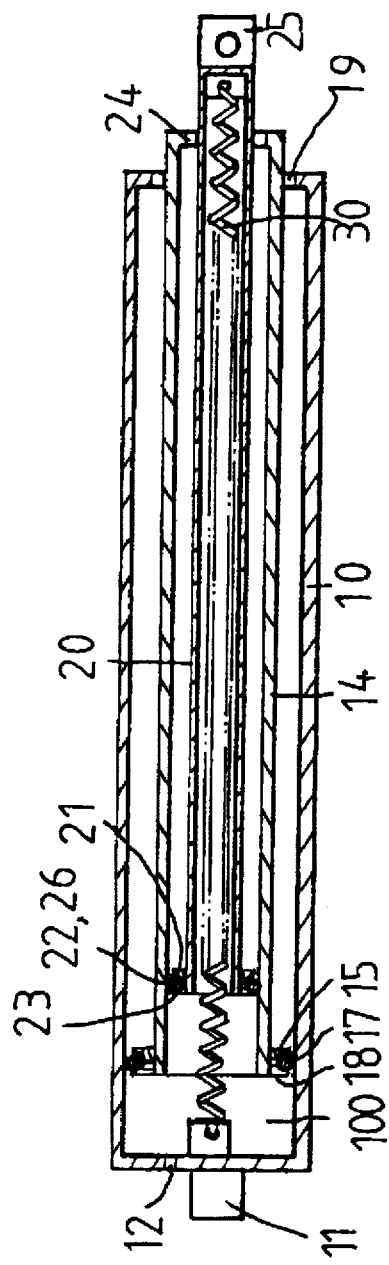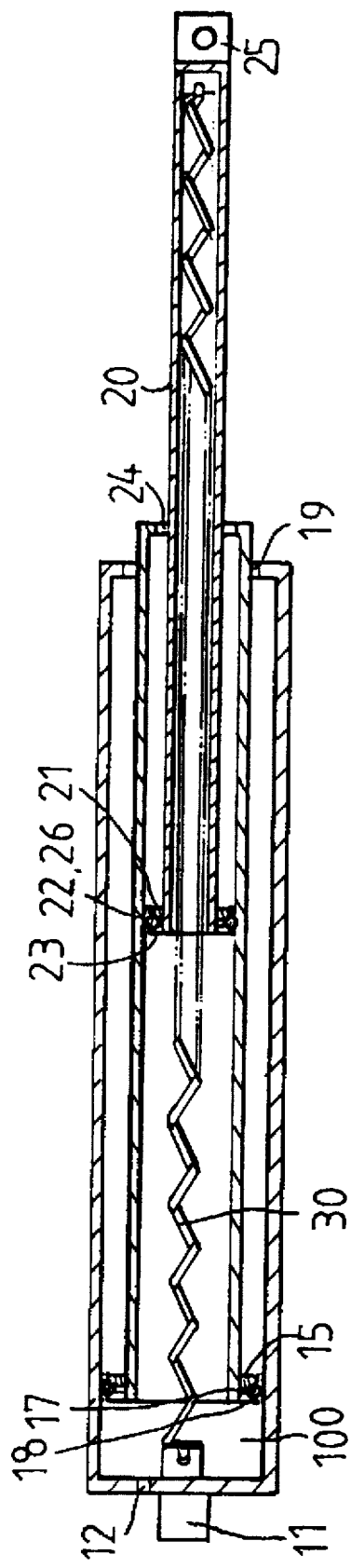
FIG. 8
FIG. 9

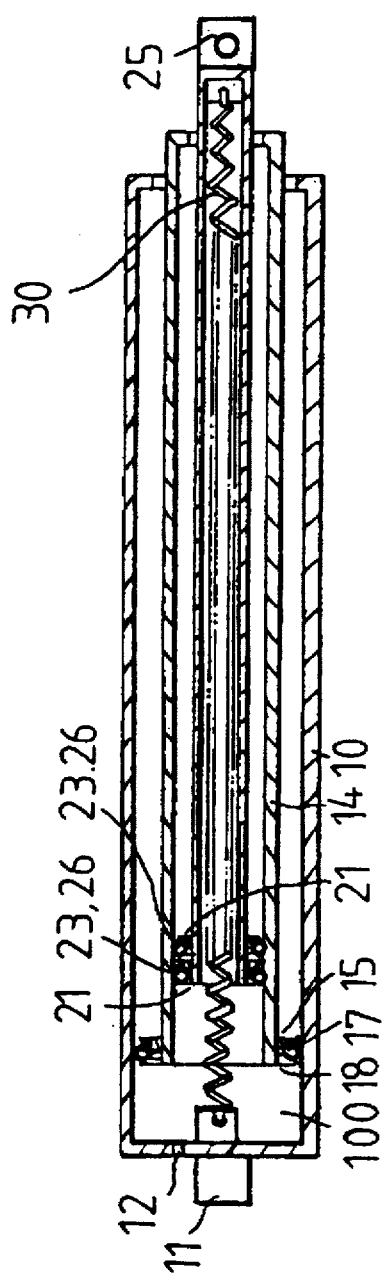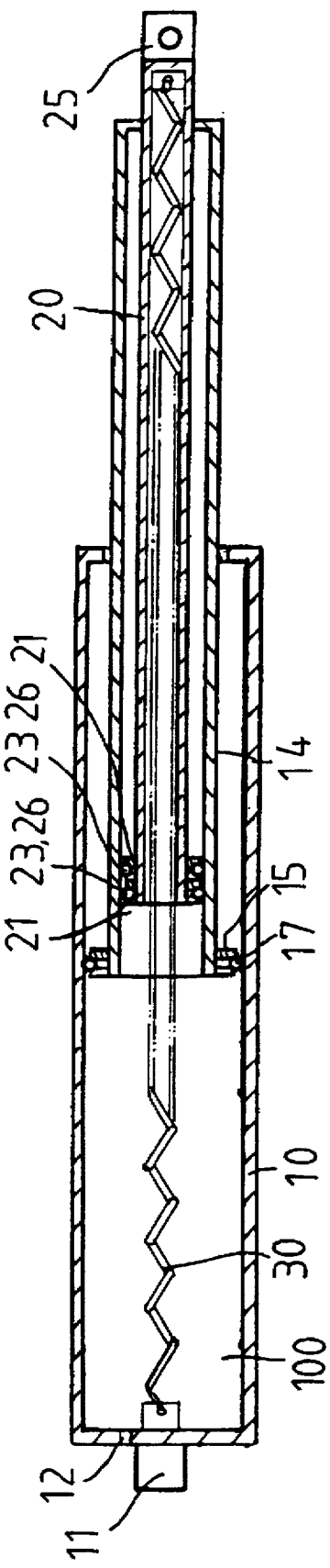

5,706,606

DEVICE FOR SHUTTING A SLIDING DOOR

BACKGROUND OF THE INVENTION

1. Field of the Invention

The present invention relates to a device for shutting, sliding door automatically.

2. Description of the Prior Art

Typical sliding doors are moved laterally manually. In order to move the sliding door backward to its closed position, a spring member is normally coupled to the door. However, the spring is exposed and is dangerous.

The present invention has arisen to mitigate and/or obviate the afore-described disadvantages of conventional sliding door shutting devices.

SUMMARY OF THE INVENTION

The primary objective of the present invention is to provide a device for shutting a sliding door automatically.

In accordance with one aspect of the invention, there is provided a device for shutting a sliding door and comprising a housing including an air hole formed in a first proximal end thereof and including an orifice formed in a second distal thereof end. The housing includes an inner peripheral surface and an inner diameter, at least one barrel is slidably engaged for telescopic movement in the housing and includes a first proximal end having a plug secured thereon and slidably engaged in the housing. The barrel includes a second distal end extending outward of the housing via the orifice. The plug includes an annular groove formed therein so as to define a first side wall arranged closer to the first end of the housing and a second side wall arranged closer to the second end of the housing. The plug includes a first end having at least one notch formed therein and communicating with the annular groove via the first side wall. The plug includes an outer diameter slightly less than the inner diameter of the housing. A sealing ring is engaged in the annular groove, the sealing ring including an outer diameter slightly greater than the inner diameter of the housing so as to engage with the inner peripheral surface of the housing. Means are provided for biasing the barrel inward of the housing. The sealing ring is caused to engage with the first side wall so as to allow air to flow by passing the plug via the notch when the barrel is moved outward of the housing. The sealing ring is caused to engage with the second side wall so as to make an air tight seal between the plug and the housing and so as to force the air to flow out of the housing via the air hole when the barrel is released and is moved inward of the housing by the biasing means.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 4 and 5 are cross sectional views taken along lines 4—4 of FIG. 1 with the door shutting device indifferent conditions;

FIGS. 8, 9 10 11 are cross sectional views illustrating operation of the sliding door shutting device having a configuration which comprises three sections.

DETAILED DESCRIPTION OF THE PREFERRED EMBODIMENT

Figure 1:
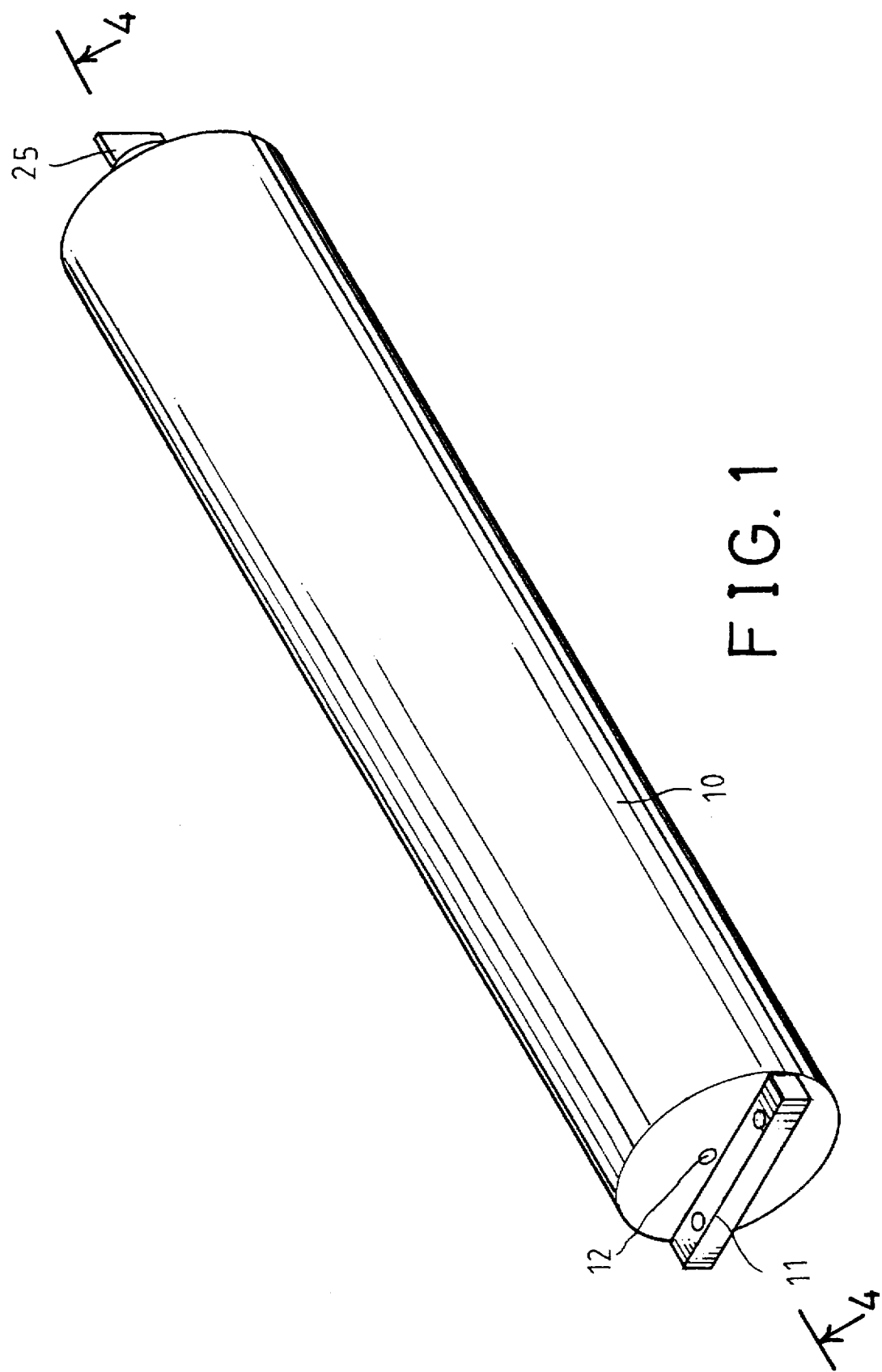
FIG. 1 is a perspective view of a sliding door shutting device in accordance with the present invention.
Figure 2:
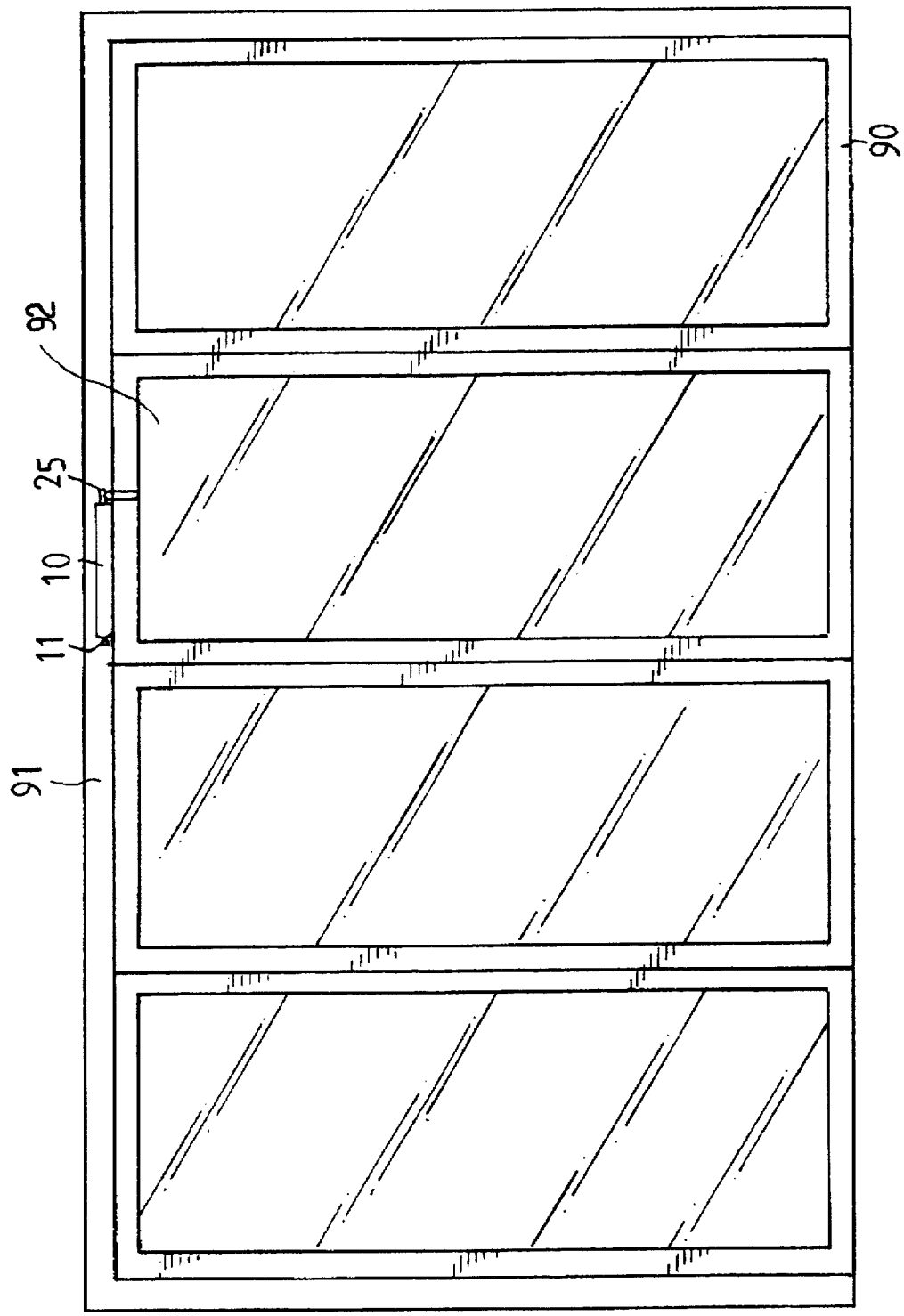
FIG. 2 is an illustrative view of a sliding door having a door shutting device disposed thereon.
Figure 3:
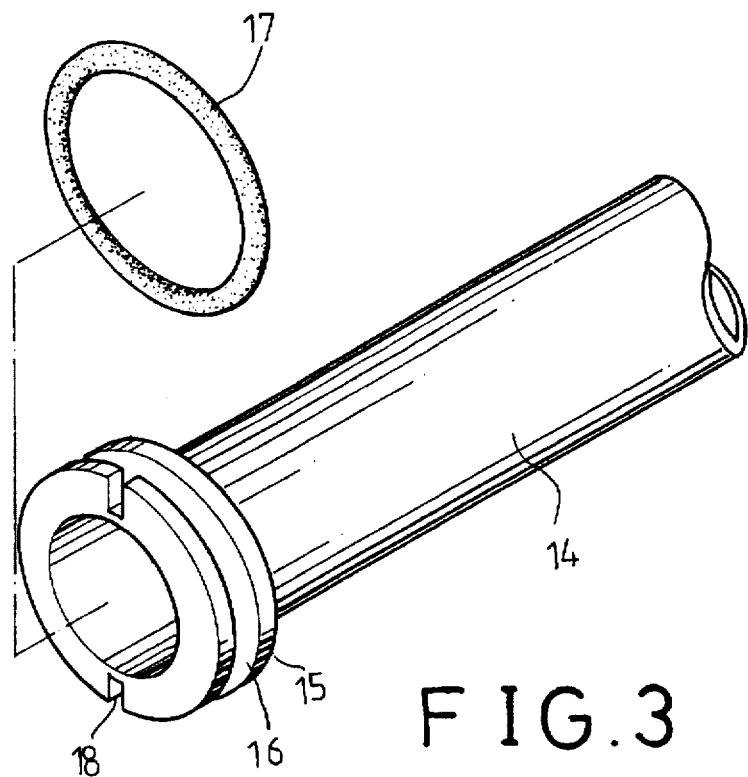
FIG. 3 is a partial exploded view illustrating inner details of the sliding door shutting device.

Referring to the drawings, and initially to FIGS. 1 to 2, a sliding door shutting device in accordance with the present invention comprises a cylindrical housing 10 including a protrusion 11 formed in one end for securing to a door frame 91 of a laterally moving door 90 and including an air hole 12 formed in one end of the housing 10. The door shutting device includes a fin 25 provided and extended from the other end of the housing 10 for securing it to a door panel 92 so as to move the door panel 92 rearwardly to the close position.

Referring to FIGS. 3 to 7, a barrel 14 is slidably engaged in the housing 10 and includes a plug 15 secured on one end and slidably engaged in the housing 10. The fin 25 is mounted on the other end of the barrel 14. The plug 15 includes an annular groove 16 formed thereabout for receiving a sealing ring 17 therein. The annular groove 16 is defined by two side walls 151, 152 (FIGS. 6 and The plug 15 has an outer diameter slightly less than the inner diameter of the housing 10, best shown in FIGS. 6 and 7. The sealing ring 17 has an outer diameter slightly greater than the inner diameter of the housing 10 so as to engage with the inner peripheral surface of the housing 10. The plug 15 has an end portion having one or more notches 18 formed therein and communicating with the annular groove 16. A spring 30 (FIGS. 4 and 5) is coupled between the housing 10 and the barrel 14 for moving the barrel 14 telescopically in the housing 10. The housing 10 includes an orifice 19 (FIGS. 4 and 5) formed in the right distal second end portion for receiving the barrel 14. The orifice 19 is larger than the barrel 14 for allowing air to flow inward and outward of the housing 10 (FIGS. 4 and 5).

Figure 6:
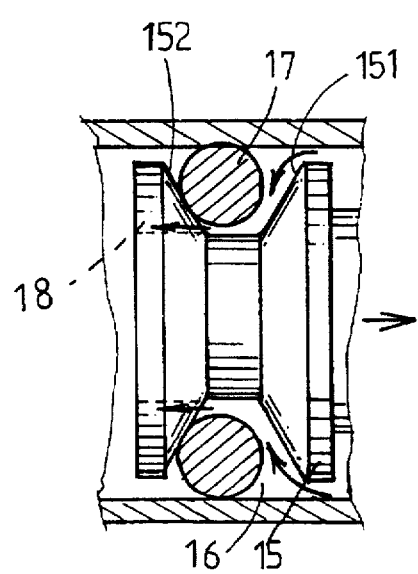
FIGS. 6 and 7 are enlarged partial cross sectional views illustrating operation of the sliding door shutting device.
Figure 7:
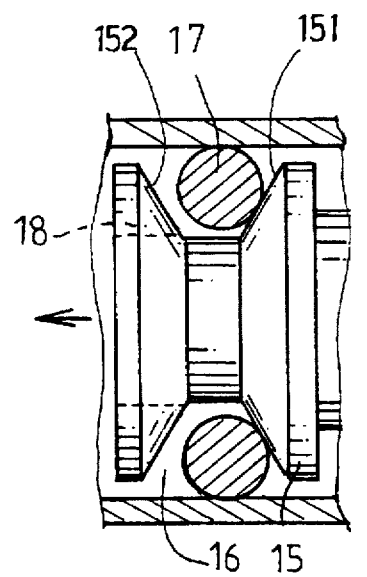

In operation, as shown in FIGS. 4, 5 6 and when the door panel 92 is opened, the barrel 14 is moved outward of the housing 10 and is moved from the position as shown in FIG. 4 to that shown in FIG. 5, the sealing ring 17 is caused to engage with the side wall 152 so as to partially block the notches 18. At this moment, the air in the right side of the plug 15 may bypass the plug 15 and move outward of the plug 15 via the notches 18 such that the barrel 14 may be moved outward of the housing 10 easily. When the barrel 14 is released and is moved from the position shown in FIG. 5 to that shown in FIG. 4, the sealing ring 17 is caused to engage with the other side wall 15i such that an air tight seal is formed by engagement of the sealing ring 17 between the plug 15 and the housing 10. At this moment, the barrel 14 is forced to move inward of the housing 10 under action of the spring 30 such that the air received in the housing 10 may be forced to flow outward of the housing 10 via the air hole 12. A valve (not shown) may be attached to the housing 10 and engaged with the air hole 12 for adjusting a preselected opening size of the air hole 12 and for adjusting a preselected moving speed of the barrel 14 relative to the housing 10.

Referring next to FIGS. 8 and 9, a tube 20 is further slidably received in the barrel 14 so as to form a three section configuration. The spring 30 is coupled between the tube 20 and the housing 10 in this configuration. The tube 20 includes a plug 21 having a configuration identical to that of the plug 15 and having an annular groove 22 for receiving a sealing ring 26. The plug 21 also includes one or more notches 23 formed therein and communicating with the annular groove 22. The barrel 14 includes an aperture 24 formed in the other end for receiving the tube 20 and for allowing air to flow into and outward of the barrel 14 via the aperture 24. The fin 25 is provided on the tube 20 for securing to the door panel. In operation, the tube 20 may first be pulled outward of the barrel 14 before the barrel 14 is pulled outward of the housing 10 (FIG. 9). On the contrary, the tube may also first be pulled inward of the barrel 14 before the barrel 14 is pulled inward of the housing 10.

Referring next to FIGS. 10 and 11, the tube 20 may include two or more plugs 21 provided thereon for increasing frictional force between the tube 20 and the barrel 14, such that the barrel 14 may first be pulled outward of the housing 10 before the tube 20 is pulled outward of the barrel 14 (FIG. 11).

Accordingly, the sliding door shutting device may be used for shutting door automatically.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for moving a sliding door laterally, said device comprising:

a housing including a first end having an air hole formed therein and including a second end having an orifice formed therein, said housing including an inner peripheral surface formed therein and including an inner diameter, at least one barrel slidably engaged in said housing and including a first end having a plug secured thereon and slidably engaged in said housing, said barrel including a second end extended outwardly of said housing via said orifice, said plug including an annular groove formed therein so as to define a first side wall arranged closer to said first end of said housing and a second side wall arranged closer to the second end of said housing, said plug including a first end having at least one notch formed in said first side wall and communicating with said annular groove, said plug including an outer diameter slightly less than the inner diameter of said housing, a sealing ring engaged in said annular groove, said sealing ring including an outer diameter slightly greater than the inner diameter of said housing for engaging with said inner peripheral surface of said housing, and a spring engaged in said housing and said barrel, said spring including a first end secured to said first end of said housing and including a second end secured to said second end of said barrel for biasing said barrel inward of said housing and for allowing said barrel to be pulled outwardly of said housing for extending a length between said first end of said housing and said second end of said barrel, said sealing ring being caused to engage with said first side wall so as to allow air to bypass said plug via said notch when said barrel is moved outwardly of said housing, and said sealing ring being caused to engage with said second side wall so as to make an air tight seal between said plug and said housing and so as to force the air to flow out of said housing via said air hole when said barrel is released and is moved inward of said housing by said spring.

* * * * *